(12) United States Patent
Ninomiya et al.

(10) Patent No.: US 9,371,769 B2
(45) Date of Patent: Jun. 21, 2016

(54) ENGINE EQUIPPED WITH SECONDARY AIR SUPPLY DEVICE

(71) Applicant: Honda Motor Co., Ltd., Tokyo (JP)

(72) Inventors: Yusuke Ninomiya, Wako-shi (JP); Chisako Takahashi, Wako-shi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/595,767

(22) Filed: Jan. 13, 2015

(65) Prior Publication Data

US 2015/0267579 A1  Sep. 24, 2015

(30) Foreign Application Priority Data

Mar. 19, 2014 (JP) ................. 2014-056302

(51) Int. Cl.
*F01P 5/02* (2006.01)
*F01N 3/30* (2006.01)
*F01N 3/34* (2006.01)
*F01N 1/14* (2006.01)
*F02B 63/04* (2006.01)
*F01N 3/10* (2006.01)
*F02M 35/08* (2006.01)

(52) U.S. Cl.
CPC ... *F01P 5/02* (2013.01); *F01N 1/14* (2013.01); *F01N 3/30* (2013.01); *F01N 3/303* (2013.01); *F01N 3/34* (2013.01); *F01N 3/103* (2013.01); *F01N 2260/16* (2013.01); *F01N 2260/26* (2013.01); *F02B 63/048* (2013.01); *F02M 35/088* (2013.01)

(58) Field of Classification Search
CPC ....... F01N 1/14; F01N 13/002; F02B 63/048; F02M 37/0011; F01P 5/02
See application file for complete search history.

(56) References Cited

U.S. PATENT DOCUMENTS

| | | | | |
|---|---|---|---|---|
| 5,983,632 A | * | 11/1999 | Fujita | F01N 3/32 60/307 |
| 2007/0089692 A1 | * | 4/2007 | Kochi | F01P 1/02 123/41.7 |

FOREIGN PATENT DOCUMENTS

JP       2604659 B2    4/1997

* cited by examiner

*Primary Examiner* — Audrey K Bradley
(74) *Attorney, Agent, or Firm* — Westerman, Hattori, Daniels & Adrian, LLP (57) ABSTRACT

An engine equipped with a secondary air supply device where a cylinder extends obliquely to define a space therebeneath, which includes: a cooling fan disposed laterally of the cylinder; a carburetor disposed closer to the space than the cooling fan; an exhaust muffler disposed opposite from the carburetor with the cylinder interposed therebetween and in communication with a cylinder head via an exhaust pipe; a secondary air introduction pipe connected to the exhaust pipe and extending from the exhaust pipe to the space so that its inlet end portion is located in the space; an intake nozzle provided in communication with the inlet end portion of the introduction pipe and having an opening portion that opens in an opposite direction from the cooling fan; and a partition wall disposed between the opening portion of the intake nozzle and the carburetor.

1 Claim, 10 Drawing Sheets

ENGINE EQUIPPED WITH SECONDARY AIR SUPPLY DEVICE

FIELD OF THE INVENTION

The present invention relates to engines equipped with a secondary air supply device that connects an exhaust port of the engine to an exhaust muffler via an exhaust pipe and supplies air (secondary air) to the exhaust pipe.

BACKGROUND OF THE INVENTION

Among examples of the conventionally-known engines equipped with a secondary air supply device are ones in which an exhaust pipe is provided for directing exhaust gas to an exhaust muffler and in which a secondary air introduction pipe is provided in communication with the exhaust pipe so that air (secondary air) is introduced into the exhaust muffler via the secondary air introduction pipe using exhaust pulsation of the engine. By air being introduced into the exhaust muffler via the secondary air introduction pipe like this, an oxidation-reduction reaction (detoxifying reaction) can be caused in exhaust gas by means of a catalyst (catalytic) converter provided within the exhaust muffler.

Further, one example of such engines equipped with a secondary air supply device is disclosed in Japanese Patent No. 2604659 (hereinafter referred to as "'JP '659"), in which a cylinder of the engine extends obliquely so that a space is defined beneath the cylinder, and in which an opening portion of the secondary air introduction pipe opens to the space. In such an engine, air is sucked through the opening portion into the secondary air introduction pipe by exhaust pulsation of the engine.

In the engine disclosed in 'JP '659, in which the opening portion of the secondary air introduction pipe opens to the space defined beneath the cylinder, cooling air blown from a cooling fan is directed to the space beneath the cylinder so that the engine (cylinder in particular) is cooled with the cooling air. Because the cooling air is directed to the space to which the opening portion of the secondary air introduction pipe opens as noted above, dust, dirt, rain water, etc. may undesirably enter through the opening. Thus, there arises a need to remove such dust, dirt, rain water, etc. from the air sucked in through the opening portion, which would make maintenance of a filter etc. cumbersome operation.

SUMMARY OF THE INVENTION

In view of the foregoing problems, it is an object of the present invention to provide an improved engine equipped with a secondary air supply device which can reliably prevent unwanted entry of dust, dirt, rain water, etc.

In order to accomplish the above-mentioned object, the present invention provides an improved engine equipped with a secondary air supply device where a cylinder extends obliquely to define a space therebeneath, which comprises: a cooling fan disposed laterally of the cylinder; a carburetor disposed closer to the space than the cooling fan; an exhaust muffler disposed opposite from the carburetor with the cylinder interposed therebetween and in communication with a cylinder head, provided on the cylinder, via an exhaust pipe; a secondary air introduction pipe connected to the exhaust pipe and extending from the exhaust pipe to the space so that an inlet end portion of the secondary air introduction pipe is located in the space; an intake nozzle provided in communication with the inlet end portion of the secondary air introduction pipe and having an opening portion that opens in an opposite direction from the cooling fan; and a partition wall disposed between the opening portion of the intake nozzle and the carburetor.

According to the present invention, the cylinder (cylinder block) extends obliquely to define the space beneath, and the intake nozzle is disposed in the space. Further, the opening portion of the intake nozzle opens in the direction opposite from the cooling fan. In addition, the partition wall is disposed between the opening portion of the intake nozzle and the carburetor, and the carburetor is disposed closer to the space than the cooling fan. With the opening portion of the intake nozzle opening in the direction opposite from the cooling fan and with the partition wall disposed between the opening portion of the intake nozzle and the carburetor as above, the present invention can prevent cooling air of the cooling fan from reaching the opening portion. As a result, the present invention can reliably prevent dust, dirt, rain water, etc. from entering through the opening portion due to the cooling air of the fan.

Fuel is vaporized by the carburetor, and the thus-vaporized fuel is supplied to the cylinder. Thus, the fuel within the carburetor may drop from the carburetor. Because the carburetor is disposed closer to the space than the cooling fan, there is a possibility of the fuel, having dropped from the carburetor, undesirably adhering to the opening portion of the intake nozzle due to cooling air blown from the cooling fan. Thus, in the present invention, the partition wall is disposed between the opening portion of the intake nozzle and the carburetor. The partition wall can prevent the fuel, having dropped from the carburetor, from being directed to the opening portion due to the cooling air. As a result, the present invention can prevent the fuel from adhering to the opening portion.

The following will describe embodiments of the present invention, but it should be appreciated that the present invention is not limited to the described embodiments and various modifications of the invention are possible without departing from the basic principles. The scope of the present invention is therefore to be determined solely by the appended claims.

BRIEF DESCRIPTION OF THE DRAWINGS

Certain preferred embodiments of the present invention will be described in detail below, by way of example only, with reference to the accompanying drawings, in which:

FIGS. 10A and 10B are views explanatory of how exhaust gas is oxidized or reduced by the embodiment of the engine equipped with the secondary air supply device, dust, dirt etc.

are prevented from entering the intake nozzle and fuel is prevented from adhering to the intake nozzle.

DETAILED DESCRIPTION OF THE INVENTION

Figure 1:
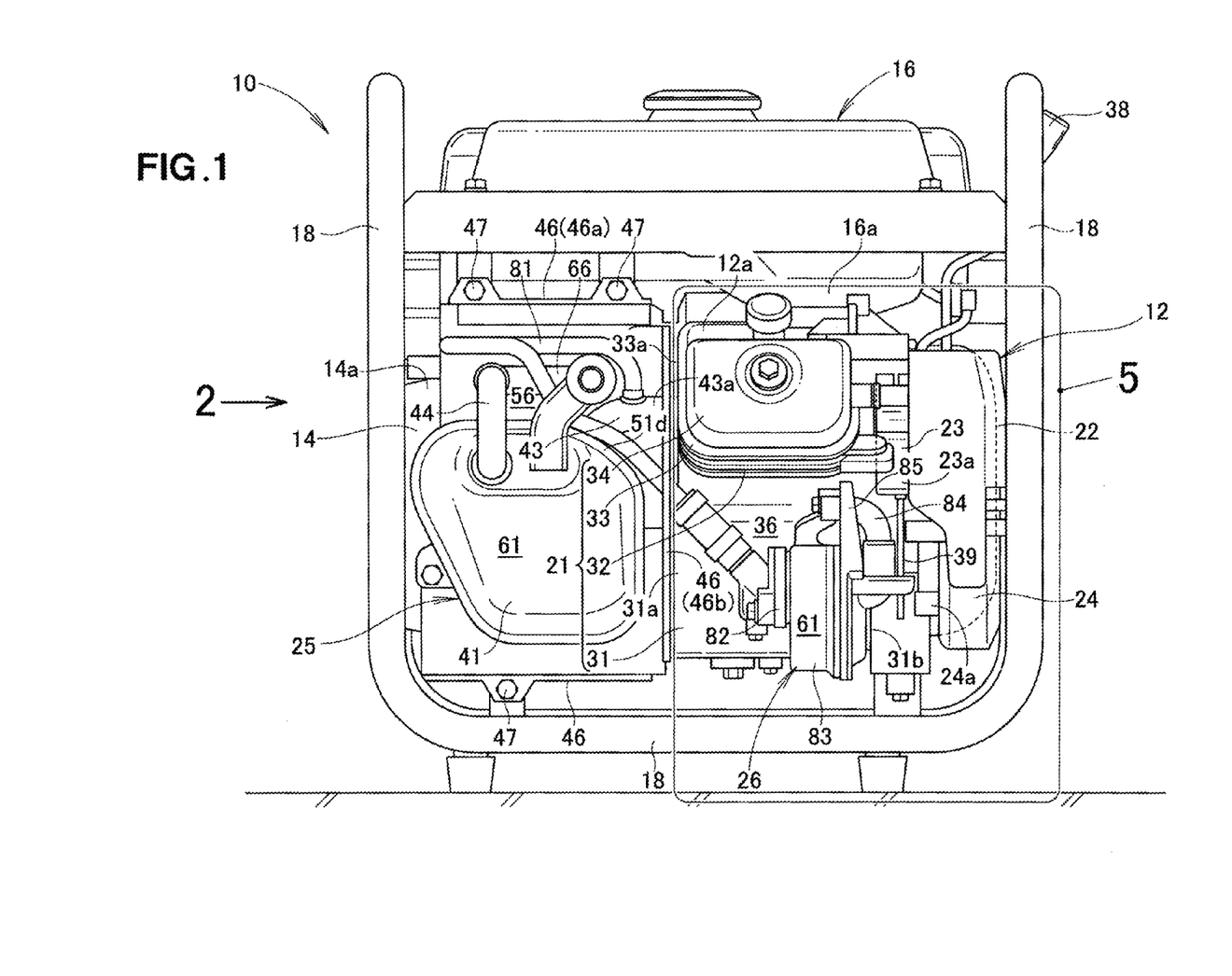
FIG. 1 is a front view showing a power generator employing an embodiment of an engine equipped with a secondary air supply device of the present invention.

FIG. 1 is a front view showing a power generator 10 employing an embodiment of an engine 12 equipped with a secondary air supply device 26 of the present invention. For ease of understanding of a construction of the embodiment, let it be assumed that, in FIG. 1, directions toward and away from a reader of the figure are "forward" and "rearward", respectively, and left and right sides of the figure are "one side" and "other side", respectively.

As shown in FIG. 1, the power generator 10 includes the engine 12 equipped with the secondary air supply device 26, a power generation section 14 provided integrally on the engine 12, a fuel tank 16 for storing fuel to be supplied to the engine 12, and a frame 18 supporting the power generator 10.

The power generation section 14 is provided on one side portion (left side portion in FIG. 1) 31a of the engine 12 (more specifically, one side portion 31a of a crankcase 31), and the fuel tank 16 is provided over respective upper portions 12a and 14a of the engine 12 and the power generator 10. With the fuel tank 16 provided over the engine 12 and the power generator 10 like this, a large storage capacity of the fuel tank 16 can be secured.

The engine 12 is a power-generating general-purpose internal combustion engine which includes: an engine body 21; a cooling fan 22 provided integrally on the engine body 21; a carburetor 23 provided in communication with an intake port of the engine body 21; an air cleaner 24 provided in communication with the carburetor 23; an exhaust means 25 provided in an exhaust port 42 (FIG. 2) of the engine body 21; and the secondary air supply device (AI: Air Injection) 26 provided in communication with the exhaust means 25.

The engine body 21 includes the crankcase 31, a cylinder block 32 formed integrally with the crankcase 31, a cylinder head 33 provided on the cylinder block 32, and a head cover 34 covering the cylinder head 33. The cylinder block 32 will hereinafter be referred to also as "cylinder", for convenience of description. The cylinder 32 extends obliquely from the crankcase 31 so that a lower space 36 is defined beneath the cylinder 32, and the fuel tank 16 is disposed over the cylinder head 33.

The cooling fan 22, which is disposed laterally of the cylinder 32, is located adjacent to respective side portions of the crankcase 31 and the cylinder head 33 by being provided on the other side portion 31b of the crankcase 31. A recoil starter is connected to the cooling fan 22, so that impellers of the cooling fan 22 rotate by a human operator pulling a handle 38 of the recoil starter and rotation of the impellers is transmitted to a crankshaft. Thus, the crankshaft rotates, so that the engine 12 is driven. By the engine 12 being driven like this, the power generation section 14 is driven.

The carburetor 23 is located closer to the lower space 36 than the cooling fan 22 and communicates with the intake port of the cylinder head 33. The air cleaner 24 is provided in communication with the carburetor 23. An inlet 24a of the air cleaner 24 is located beneath the carburetor 23.

Air is directed through the intake 24a of the air cleaner 24 into the air cleaner 24, so that fuel is vaporized by the carburetor 23 and the thus-vaporized fuel is directed to the cylinder head 33 via the intake port.

A discharge pipe 39 is provided in communication with a lower portion 23a of the carburetor 23. Thus, the fuel directed to the carburetor 23 is discharged to the outside 61 via the discharge pipe 39 as it drops from the lower portion 23a of the carburetor 23.

The exhaust means 25 includes an exhaust muffler 41 disposed adjacent to the one side (left side in FIG. 1), an exhaust pipe 43 connecting the exhaust port 42 (FIG. 2) to the exhaust muffler 41, and a tailpipe 44 that discharges exhaust gas of the exhaust muffler 41 to the outside 61. The exhaust port 42 is formed in the one side portion (left side portion in FIG. 1) 33a of the cylinder head 33, so that exhaust gas within the cylinder 32 is discharged to outside of the cylinder head 33 via the exhaust port 42.

Further, the power generation section 14 and the exhaust muffler 41 are disposed opposite from the carburetor 23 with the cylinder 32 and the cylinder head 33 interposed therebetween. The exhaust muffler 41 is disposed forward (in front) of the power generation section 14.

Further, a partition member 46 is fixed to the engine 12 and the power generation section 14 by means of a bolt 47. The exhaust muffler 41 is partitioned off from the fuel tank 16 via an upper wall portion 46a of the partition member 46. Further, the exhaust muffler 41 is partitioned off from the engine 12 via a side wall portion 46b of the partition member 46.

Figure 2:
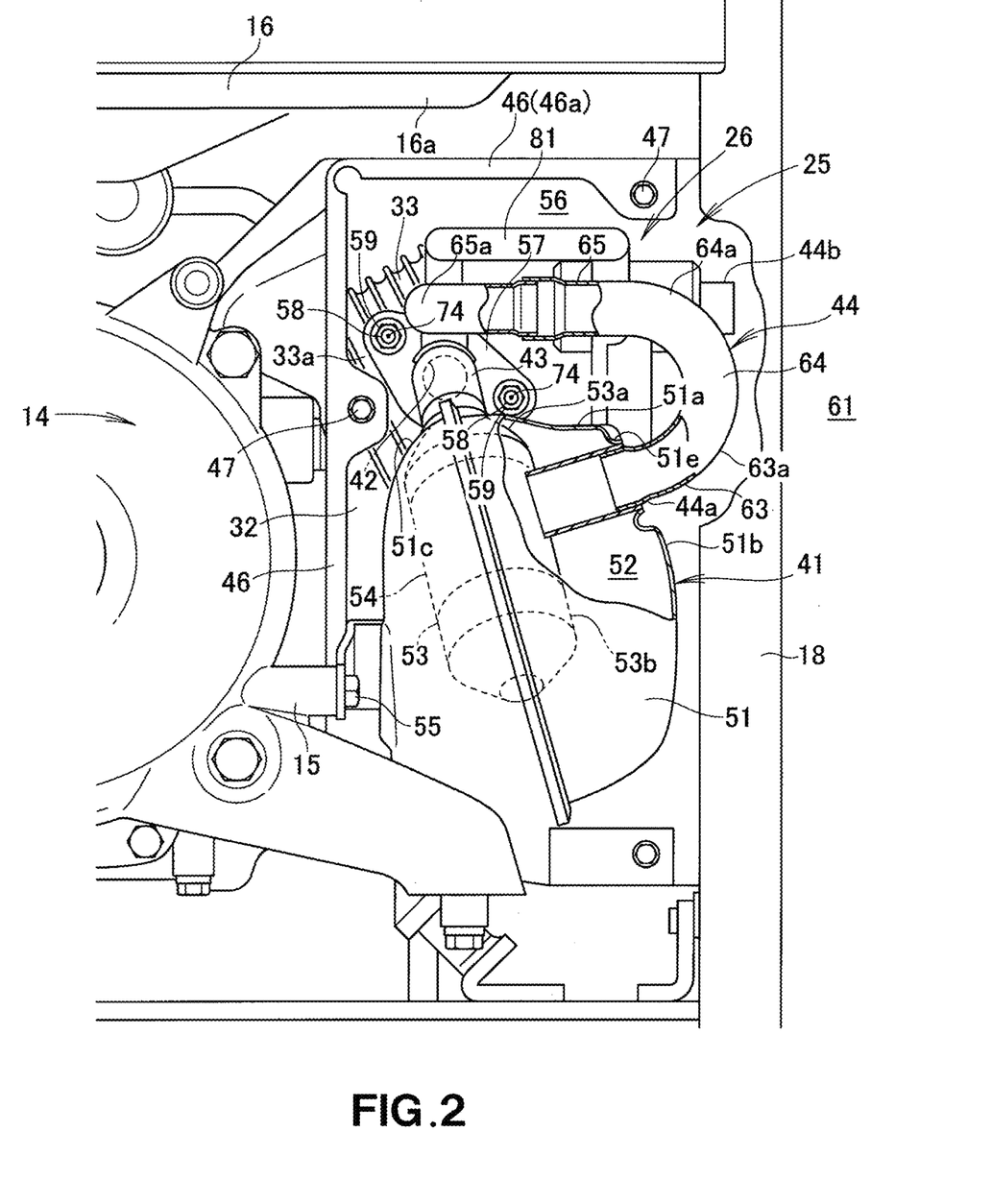
FIG. 2 is a view taken in the direction of arrow 2 of FIG. 1.
Figure 3:
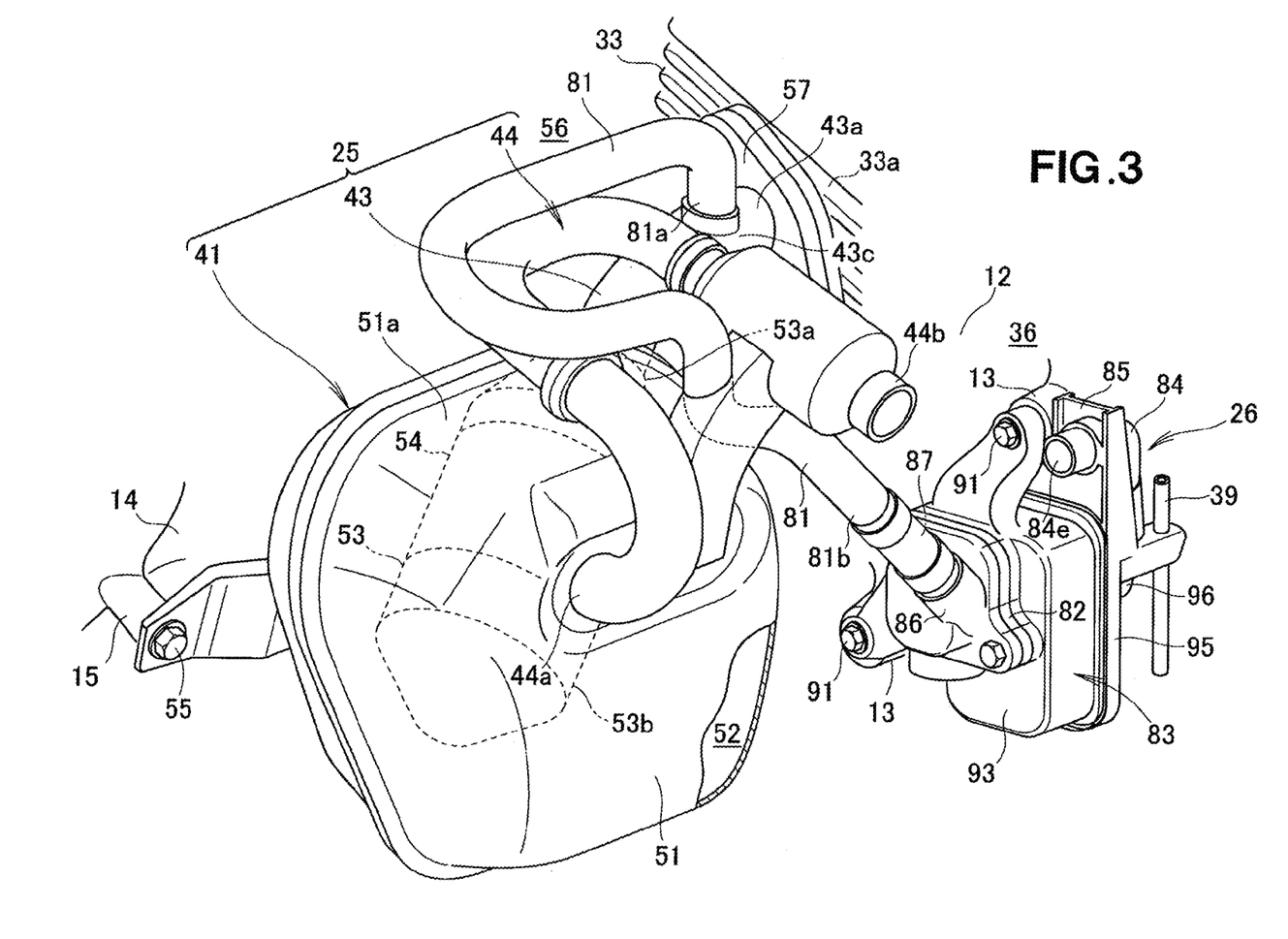
FIG. 3 is a perspective view showing an exhaust means provided in the engine and the secondary air supply device of FIG. 1.

Further, as shown in FIGS. 2 and 3, the exhaust muffler 41 is disposed beneath the fuel tank 16 and below the exhaust port 42. The exhaust muffler 41 has a retaining cylinder 53 accommodated in the interior 52 of the muffler box 51, and a catalyst converter 54 retained on the inner wall of the retaining cylinder 53.

A muffler box 51 is in the form of a hollow box of a rectangular parallelepiped shape. The muffler box 51 is disposed beneath the fuel tank 16 by being fixed, for example, to a boss 15 of the power generation section 14 by mean of a bolt 55. Thus, the fuel tank 16 is located above an upper muffler surface portion 51a of the muffler box 51, so that an upper space 56 is defined between the upper muffler surface portion 51a and a lower portion 16a of the fuel tank 16.

The retaining cylinder 53 has a front end portion 53a communicating with the interior of the cylinder head 33 (more specifically, a combustion chamber) via the exhaust pipe 43 and the exhaust port 42. Further, a rear end portion 53b of the retaining cylinder 53 has a rear opening portion (not shown) that opens to the interior 52 of the muffler box 51.

Figure 4:
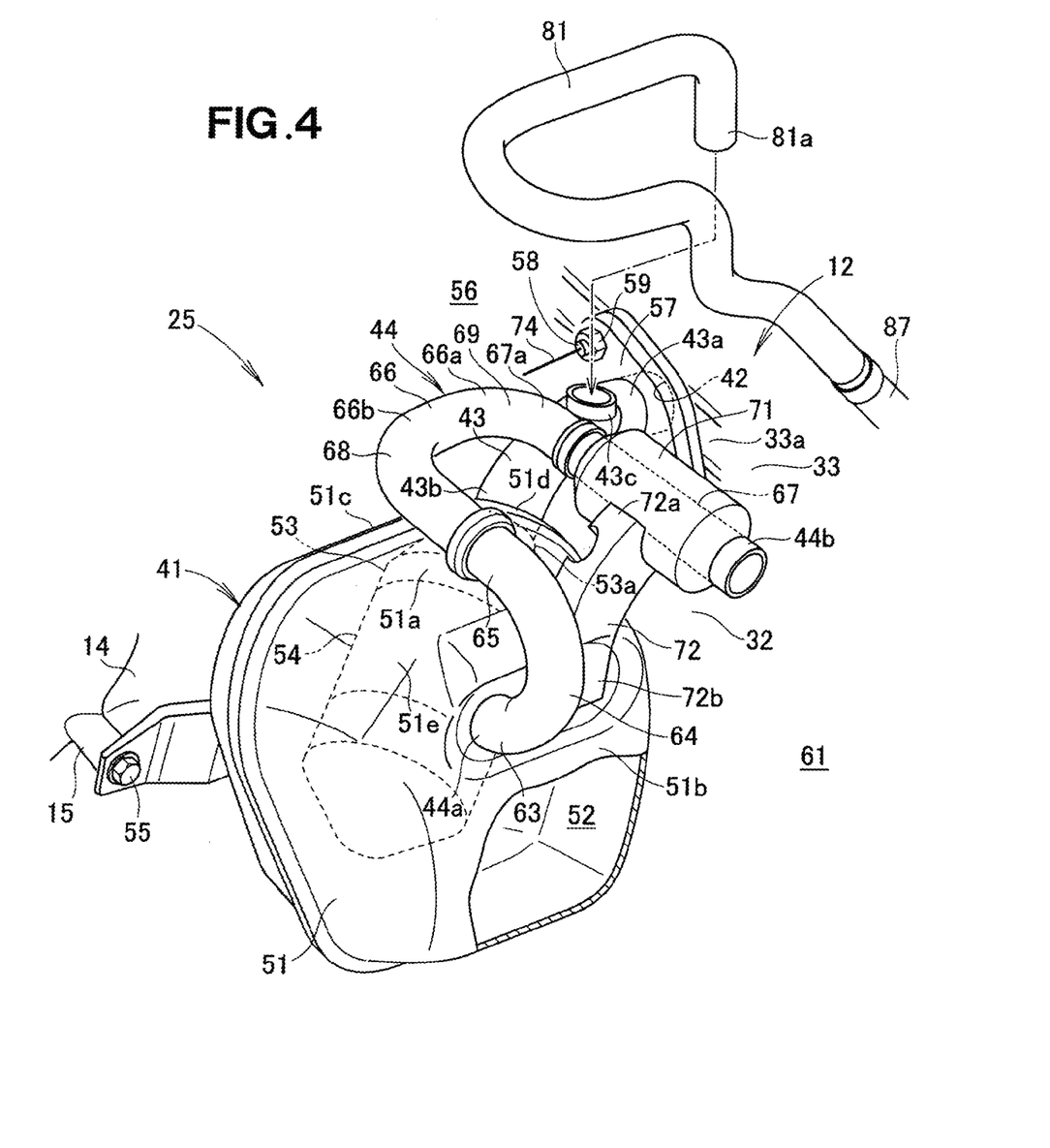
FIG. 4 is an exploded perspective view corresponding to FIG. 3.

Further, as shown in FIG. 4, the exhaust pipe 43 has a flange 57 formed on its front end portion 43a and connected to the one side portion (left side portion) 33a of the cylinder head 33 by means of a bolt 58 and a nut 59 (see also FIG. 2). Thus, the front end portion 53a of the exhaust pipe 43 communicates with the exhaust port 42 of the cylinder head 33. Also, the exhaust pipe 43 has a rear end portion 43b communicating with the front end portion 53a of the retaining cylinder 53.

Thus, exhaust gas within the cylinder 32 is directed to the exhaust port 42, the exhaust pipe 43 and to the retaining cylinder 53. The exhaust gas thus directed to the retaining cylinder 53 is subjected to oxidation-reduction (detoxification) by the catalyst converter 54 within the retaining cylinder 53. The exhaust gas having been thus subjected to oxidation-reduction by the catalyst converter 54 is directed through the rear opening portion of the retaining cylinder 53 to the interior 52 of the muffler box 51.

The tailpipe 44 has a proximal end portion 44a connected to a front wall 51b of the muffler box 51 so that it communicates with the interior 52 of the muffler box 51. Further, the tailpipe 44 has a distal end portion 44b opening to the outside 61 of the muffler box 51. Although the tailpipe 44 comprises a plurality of interconnected pipes as shown in the figures, it will hereinafter be described as comprising a single bent pipe, for convenience of description.

In the illustrated example, the tailpipe 44 comprises a first pipe section 63, a second pipe section 64, a third pipe section 65, a fourth pipe section 66 and a fifth pipe section 67. The tailpipe 44 is bent so that the first to fifth pipe sections 63 to 67 are interconnected in a meandering configuration.

Referring back to FIG. 2, the first pipe section 63 is connected at the proximal end portion 44a to the front wall 51b of the muffler box 51 and extends obliquely forward and upward away from the front wall 51b. The first pipe section 63 has a front end portion 63a located near the upper muffler surface portion 51a of the muffler box 51.

The second pipe section 64 extends upward from the front end portion 63a of the first pipe section 63 in an arcuately curved shape. Because the front end portion 63a of the first pipe section 63 is located near the upper muffler surface portion 51a of the muffler box 51, the second pipe section 64 is located in the upper space 56 higher than the upper muffler surface portion 51a.

The third pipe section 65 extends substantially horizontally from an upper end portion 64a of the second pipe section 64, toward the power generator 14 (i.e., rearward), to a rear end portion 51c of the upper muffler surface portion 51a. Thus, the third pipe section 65 is located in the upper space 56 higher than the upper muffler surface portion 51a.

Further, as shown in FIG. 4, the fourth pipe section 66 extends substantially horizontally from a rear end portion 65a of the third pipe section 65, toward the cylinder head 33 (i.e., toward the one side portion), to near an end portion 51d of the upper muffler surface portion 51a (see also FIG. 1). Thus, the fourth pipe section 66 is located in the upper space 56 higher than the upper muffler surface portion 51a. Further, the fourth pipe section 66 has an end portion 66a located above the end portion 51d of the upper muffler surface portion 51a. A first horizontally curved portion 68 is formed in an intersecting portion between the rear end portion 65a of the third pipe section 65 and another end portion 66b of the fourth pipe section 66.

Further, the fifth pipe section 67 extends substantially horizontally forward from the end portion 66a of the fourth pipe section 66. Thus, the fifth pipe section 67 is located in the upper space 56 higher than the upper muffler surface portion 51a and the exhaust pipe 43. An outer cylinder 71 is provided around the outer periphery of the fifth pipe section 67, and the outer cylinder 71 is supported on an upper end portion 72a of a support member 72. The support member 72 is fixed at its lower end portion 72b to the front wall 51b of the muffler box 51.

A distal end portion 44b of the fifth pipe section 67 (i.e., distal end portion of the tailpipe 44) projects forward beyond a front end portion 51e of the upper muffler surface portion 51a. A second horizontally curved portion 69 is formed in an intersecting portion between the end portion 66a of the fourth pipe section 66 and a rear end portion 67a of the fifth pipe section 67.

Here, the fifth pipe section 67 is spaced apart from the bolt 58 and the nut 59 fastening the flange 57 to the cylinder head 33; more specifically, the fifth pipe section 67 is located closer to the one side portion 31a than the bolt 58 and the nut 59. Further, with the second to fifth pipe sections 64 to 67 located above the upper muffler surface portion 51a, these pipe sections 64 to 67 are disposed in the upper space 56 (see FIG. 2).

Further, as shown in FIGS. 2 and 4, the tailpipe 44 is formed in such a manner that the first to third pipe sections 63 to 65 meander in a generally V shape as viewed laterally from one side of the muffler 41 (i.e., as viewed in a horizontal direction). Further, the tailpipe 44 is disposed in such a manner that the third to fifth pipe sections 65 to 67 meander in the upper space 56 in a generally U shape as viewed in the vertical direction.

Namely, the whole of the tailpipe 44 (more specifically, the second to fifth pipe sections 64 to 67 of the tailpipe 44) is formed in the upper space 56 so as to meander in the horizontal and vertical direction. By meandering in the upper space 56, the tailpipe 44 can have a suitable length in the limited upper space 56 without extending downward.

Further, the third to fifth pipe sections 65, 66 and 67 are located above and forward of an imaginary horizontal extension line 74 extending from the axis of the bolt 58 and the nut 59 while avoiding the imaginary extension line 74. Namely, the entire tailpipe 44 is provided to meander in the space 56 while avoiding the imaginary extension line 74.

The following explains in detail why the entire tailpipe 44 is provided to meander in such a manner as to avoid the imaginary extension line 74. Namely, the exhaust muffler 41 is disposed beneath the fuel tank 16 and below the exhaust port 42 in a region lateral of the one side of the cylinder head 33. Further, the exhaust pipe 43 is fixedly connected to the one side portion 33a of the cylinder head 33 by means of the bolt 58 and the nut 59, and the exhaust pipe 43 communicates with the exhaust port 42. Thus, the bolt 58 and the nut 59 are located in the upper space 56 between the exhaust muffler 41 and the fuel tank 16.

Therefore, in some cases, it is conceivable that the tailpipe 44 disposed in the upper space 56 is located on the imaginary extension line 74 of the bolt 58 and the nut 59, in which cases operations for attaching and detaching the bolt 58 and the nut 59 might be undesirably disturbed by the existence of the tailpipe 44.

Thus, in the instant embodiment, the third to fifth pipe sections 65 to 67 of the tailpipe 44 are disposed above and forward of the imaginary extension line 74 so as to avoid the imaginary extension line 74. In this way, the entire tailpipe 44 can be meandered in such a manner as to avoid the imaginary extension line 74, and thus, the bolt 58 and the nut 59 can be attached and detached without being disturbed by the existence of the tailpipe 44.

In addition, the tailpipe 44 (more specifically, the fifth pipe section 67) is spaced apart from, i.e. disposed closer to the one side portion than, the bolt 58 and the nut 59. In this way, the tailpipe 44 can be prevented from interfering with (hitting) the bolt 58 and the nut 59 and thus can have a sufficient durability.

Further, the proximal end portion 44a of the tailpipe 44 is in communication with the interior 52 of the muffler box 51, and the distal end portion 44b of the tailpipe 44 opens to the outside 61. Thus, exhaust gas directed to the interior 52 of the muffler box 51 through the rear opening portion of the retaining cylinder 53 is discharged to the outside 61 of the muffler box 51 via the tailpipe 44. The secondary air supply device 26 is in communication with the exhaust pipe 43 of the exhaust means 25.

Figure 5:
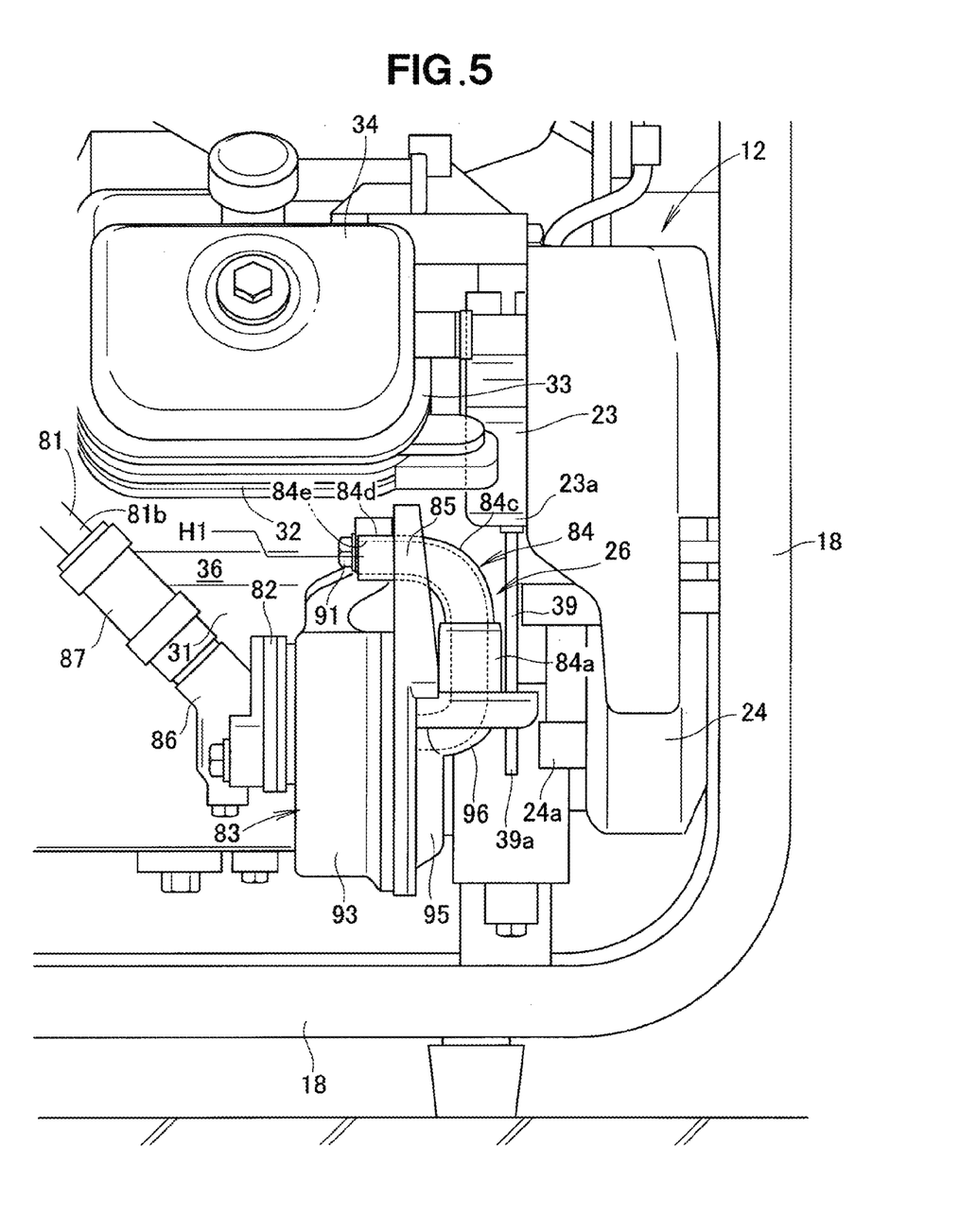
FIG. 5 is an enlarged view of a section surrounded at 5 in FIG. 1.

Further, as shown in FIG. 5, the secondary air supply device 26 includes: a secondary air introduction pipe 81 connected to the exhaust pipe 43 (see FIG. 1); a one-directional valve 82 provided on the secondary air introduction pipe 81; an air filter 83 connected to the one-directional valve 82; an intake nozzle 84 connected to the air filter 83; and a partition wall 85 supporting the intake nozzle 84.

Further, as shown in FIG. 3, the secondary air introduction pipe 81 has an outlet end portion 81a connected to a portion of the exhaust pipe 43 adjacent to the flange 57. The secondary air introduction pipe 81 is meandered in the upper space 56 and extends in a downward slope from the upper space 56 to the lower space 36 (see also FIG. 1), so that an inlet end portion 81b of the secondary air introduction pipe 81 is located in the lower space 36. With the secondary air introduction pipe 81 meandered in the upper space 56 and extending in a downward slope from the upper space 56 to the lower space 36 as noted above, a suitable length of the secondary air introduction pipe 81 can be secured.

Figure 6:
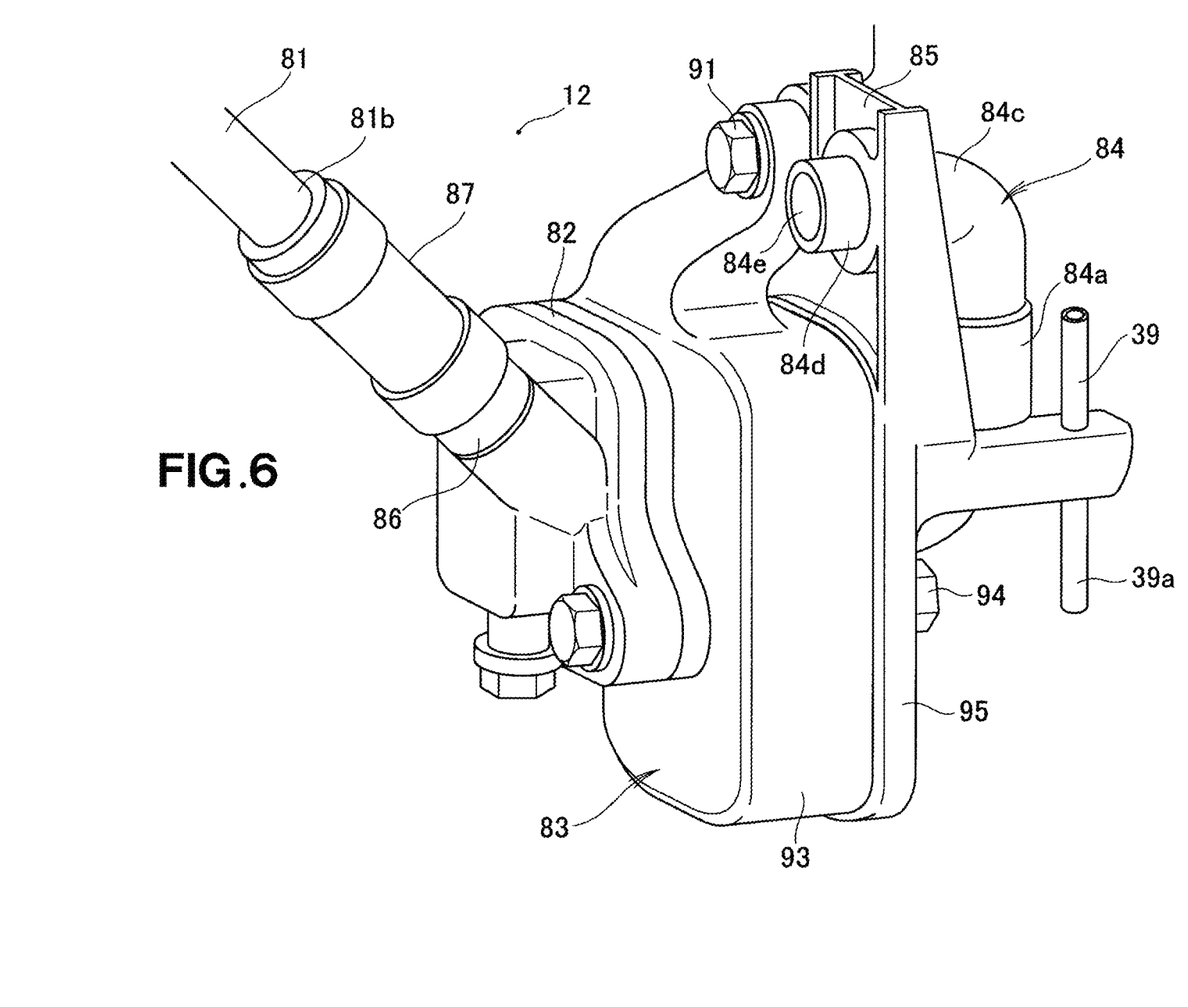
FIG. 6 is a perspective view showing the secondary air supply device of FIG. 3.

Further, as shown in FIG. 6, an outlet pipe 86 of the one-directional valve 82 is connected via a connection pipe 87 to the inlet end portion 81b of the secondary air introduction pipe 81. The one-directional valve 82 is opened in response to pressure in the interior 52 (see FIG. 3) of the muffler box 51 becoming negative due to exhaust pulsation of the engine 12, and the one-directional valve 82 is closed in response to the pressure in the interior 52 of the muffler box 51 becoming positive due to the exhaust pulsation of the engine 12. Thus, once the pressure in the interior 52 of the muffler box 51 becoming negative, air (secondary air) can be introduced into the secondary air introduction pipe 81 via the one-directional valve 82. The air filter 83 is provided upstream of the one-directional valve 82.

Figure 7:
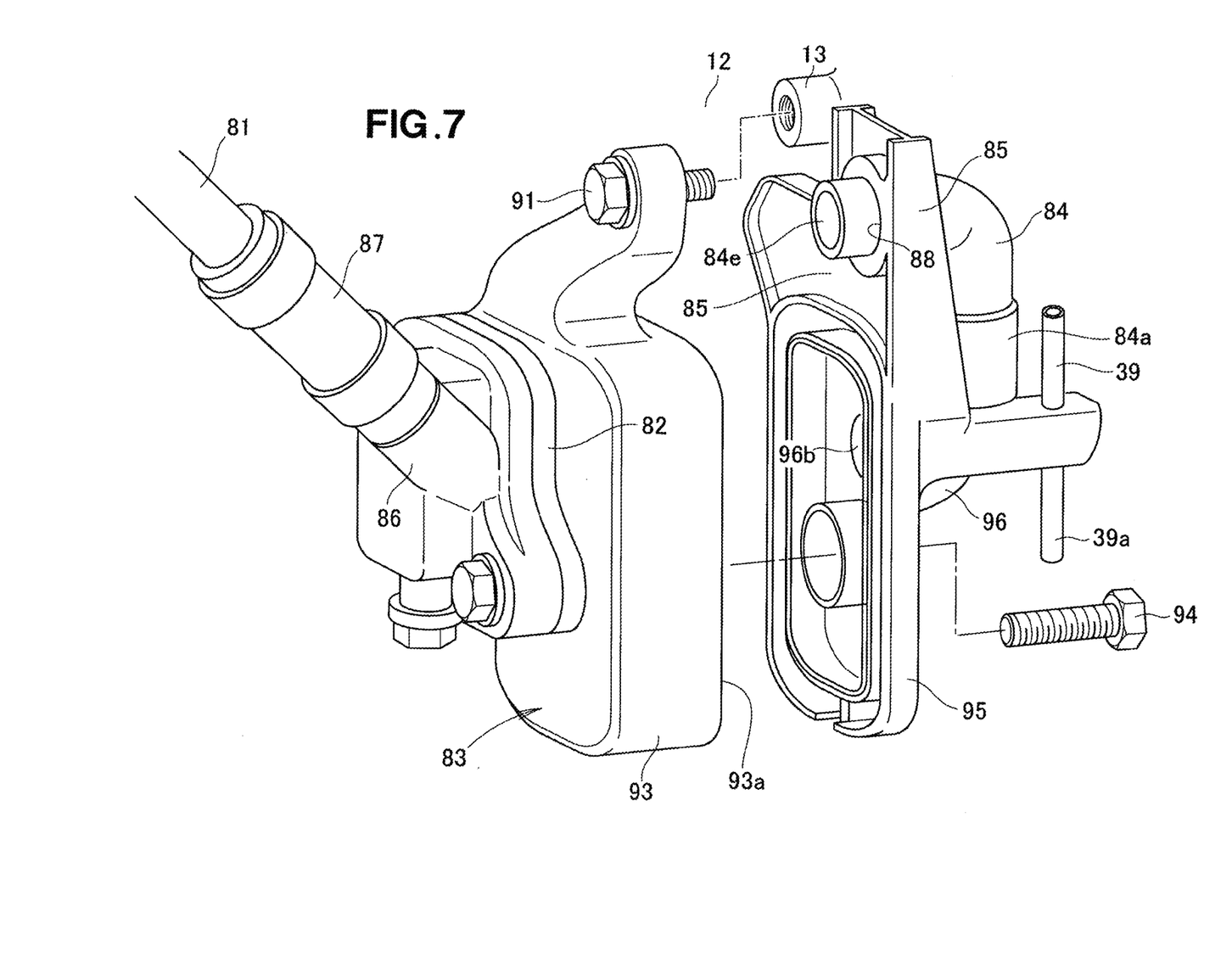
FIG. 7 is an exploded perspective view of the secondary air supply device of FIG. 6.

Further, as shown in FIG. 7, the air filter 83 includes: a filter case 93 fixed to a boss 13 of the engine 12 by means of a bolt 91; a filter (not shown) accommodated in the filter case 93; and a filter cover 95 fixed to an opening portion 93a of the filter case 93 by means of a bolt 94. Air is sucked into the air filter 83 from the intake nozzle 84. The air thus sucked into the air filter 83 is filtered through the filter and then introduced into the secondary air introduction pipe 81 via the one-directional valve 82.

Figure 8:
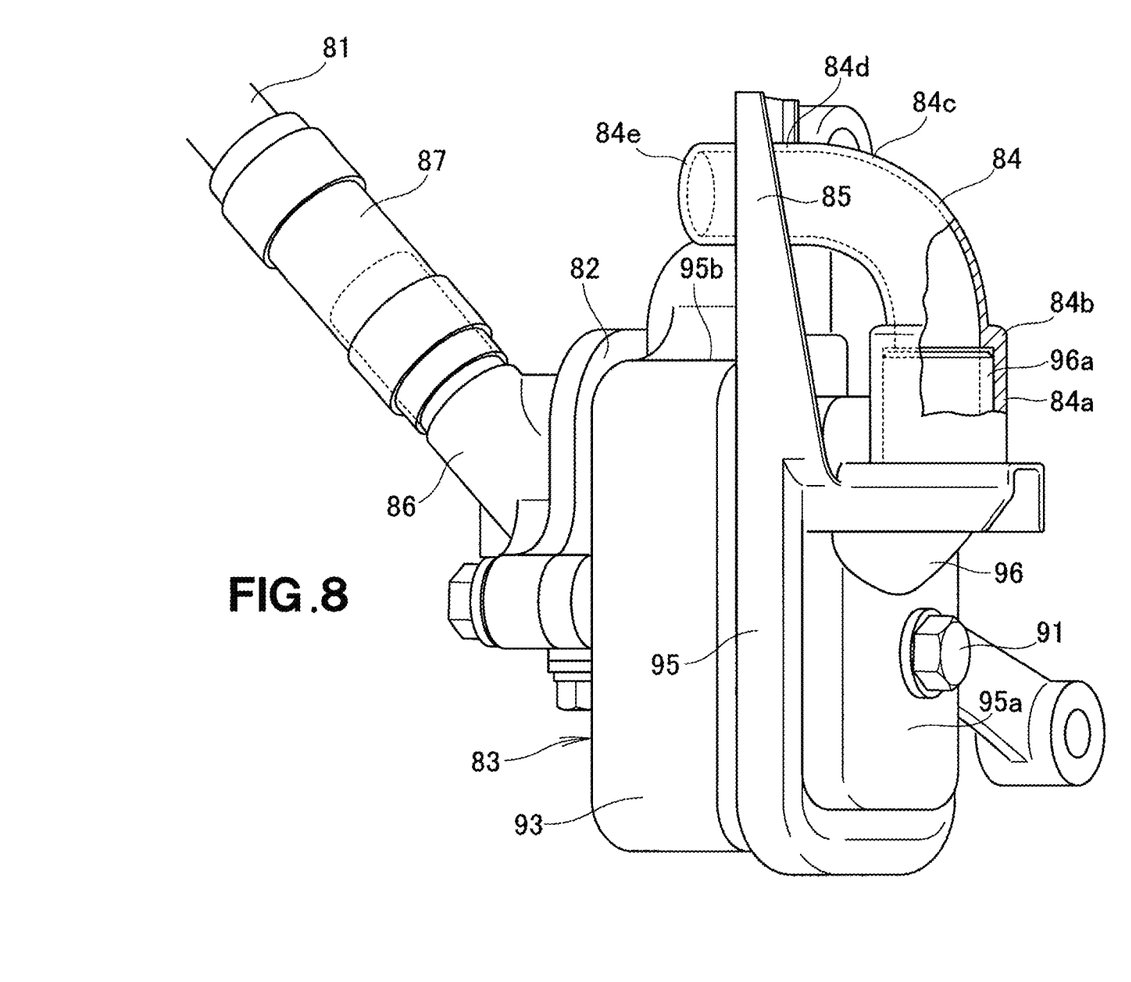
FIG. 8 is a perspective view of the secondary air supply device of FIG. 6 taken from the side of a filter cover.

Further, as shown in FIG. 8, a filter inlet pipe 96 extends in a curved shape from a front wall 95a of the filter cover 95 toward an upper inlet, and an inlet port 96a of the filter inlet pipe 96 projects vertically upward. An outlet port 96b (see FIG. 7) of the filter inlet pipe 96 is located within the air filter 83 opens toward the upstream end of the filter. A fitting nozzle section 84a of the intake nozzle 84 is fittingly connected to the inlet port 96a of the filter inlet pipe 96.

Figure 9:
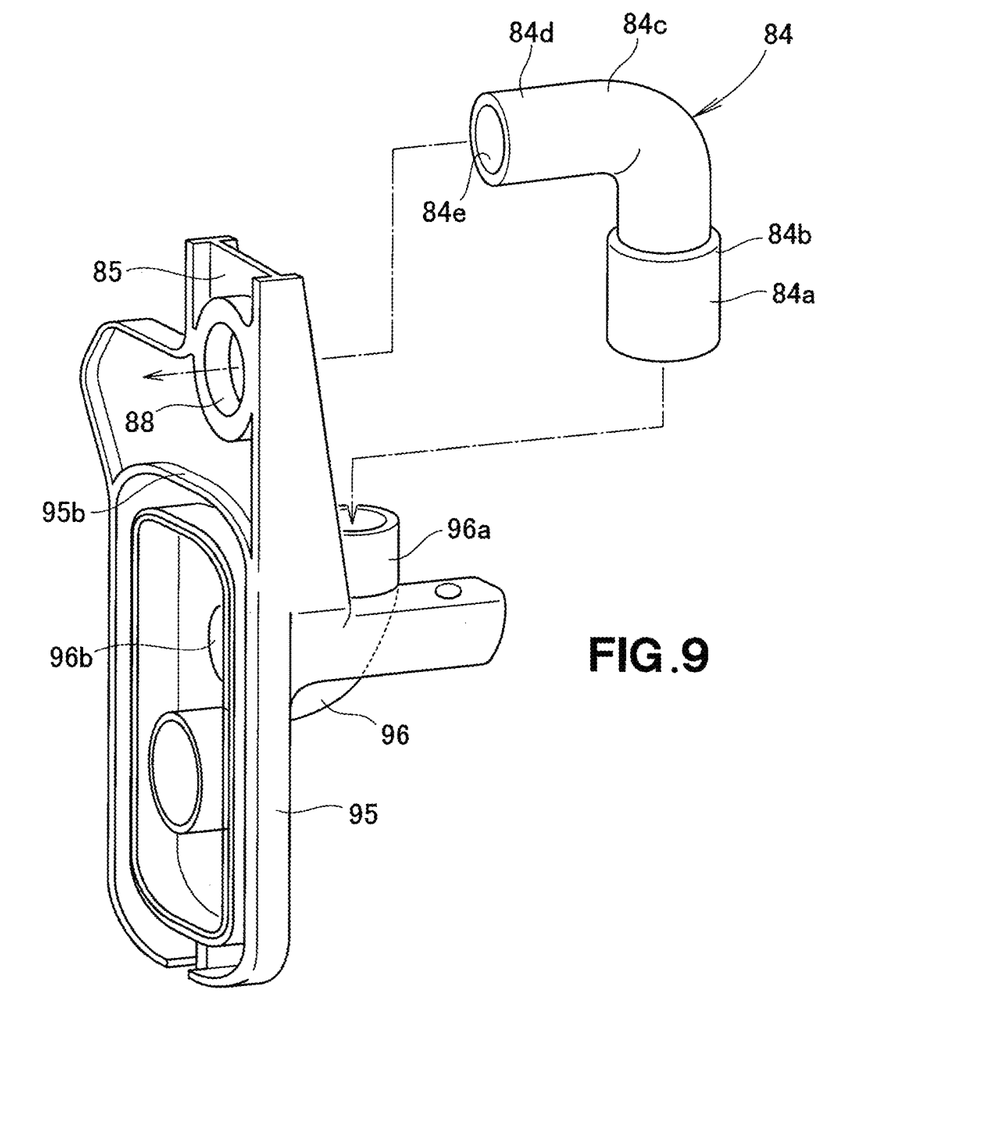
FIG. 9 is an exploded perspective view of the filter cover and an intake nozzle of FIG. 7.

Further, as shown in FIG. 9, the intake nozzle 84 includes the fitting nozzle section 84a extending vertically to be fitted over the inlet port 96a of the filter inlet pipe 96, and an extension nozzle section 84c extending from an upper end portion 84b of the fitting nozzle section 84a in a direction opposite from (i.e., away from) the cooling fan 22 (see FIG. 1). With the fitting nozzle section 84a and the extension nozzle section 84c, the intake nozzle 84 is formed in a generally inverted-J shape.

The extension nozzle section 84c has its distal end portion 84d inserted in a through-hole 88 of the partition wall 85. With the fitting nozzle section 84a fitted over the inlet port 96a of the filter inlet pipe 96 and the distal end portion 84d inserted in the through-hole 88 as noted above, the intake nozzle 84 is fixed to the inlet port 96a and the partition wall 85.

Referring now back to FIG. 5, with the intake nozzle 84 fixed in the aforementioned manner, an opening portion 84e of the intake nozzle 84 opens in the opposite direction from the cooling fan 22 (see FIG. 1). Further, the opening portion 84e of the intake nozzle 84 is located beneath the carburetor 23 and closer to the one side portion (i.e., closer to the lower space 36) than the carburetor 23.

Further, as shown in FIG. 3, the intake nozzle 84 is in communication with the secondary air introduction pipe 81 via the air filter 83 and the one-directional valve 82. Thus, air sucked in through the opening portion 84e of the intake nozzle 84 by the exhaust pulsation of the engine 12 is directed to the secondary air introduction pipe 81 via the intake nozzle 84, the filter inlet pipe 96, the air filter 83 and the one-directional valve 82.

Further, the air directed to the secondary air introduction pipe 81 as noted above is directed into the retaining cylinder 53 of the exhaust muffler 41 via the secondary air introduction pipe 81 and the exhaust valve 43. Thus, the air sucked in through the opening portion 84e of the intake nozzle 84 is directed to the catalyst converter 54 of the retaining cylinder 53.

Further, as shown in FIGS. 5 and 9, the partition wall 85 projects upward from an upper portion 95b of the filter cover 95, and the through-hole 88 is formed through the thickness of the partition wall 85. Thus, the through-hole 88 is located above the filter cover 95 and an outlet 39a of the discharge pipe 39. The partition wall 85 is located beneath the carburetor 23 and closer to the one side (i.e., closer to the lower space 36) than the carburetor 23. With the extension nozzle section 84c inserted through the through-hole 88 of the partition wall 85, the opening portion 84e of the intake nozzle 83 is located adjacent to a side of the partition wall 85 opposite from the carburetor 23, i.e. the partition wall 85 is located between the opening portion 84e of the intake nozzle 84 and the carburetor 23.

Further, with the extension nozzle section 84c inserted through the through-hole 88 of the partition wall 85, the opening portion 84e of the intake nozzle 84 is located adjacent to a side of the partition wall 85 opposite from the carburetor 23. Namely, the opening portion 84e of the intake nozzle 84 is partitioned off from the carburetor 23 by the partition wall 85.

The carburetor 23 is located closer to the lower space 36 than the cooling fan 22 (FIG. 1). Thus, the partition wall 85 is located between the opening portion 84e of the intake nozzle 84 and the cooling fan 22 with the opening portion 84e partitioned off from the carburetor 23 by the partition wall 85.

Thus, the partition wall 85 can not only prevent cooling air of the cooling fan 22 from reaching the opening portion 84e but also prevent dust, dirt, rain water, etc. from entering through the opening portion 84e. Further, the opening portion 84e opens in the opposite direction from the cooling fan 22, so that it is possible to further reliably prevent dust, dirt, rain water, etc. from entering the intake nozzle 84 through the opening portion 84e due to cooling air blown from the cooling fan 22.

In some cases, it is conceivable to form, in a wall portion of the air filter 83 closer to the cooling fan 22, an intake inlet for sucking secondary air into the air filter 83. It is also likely for fuel within the carburetor 23 to be dropped (discharged) to the outside 61 via the discharge pipe 39 of the carburetor 23. The discharge pipe 39 is located closer to the lower space 36 than the cooling fan 22, and the intake inlet of the air filter 83 is located closer to the lower space 36 than the discharge pipe 39. Thus, the fuel discharged to the outside 61 via the discharge pipe 39 may undesirably adhere to the intake inlet of the air filter 83 due to cooling air blown from the cooling fan 22.

To avoid such an inconvenience, the extension nozzle section 84c in the instant embodiment is inserted through the through-hole 88 formed above the filter cover 95 so that the opening portion 84e of the intake nozzle 84 is located at a position H1 higher than the outlet 39a of the discharge pipe 39. Further, the partition wall 85 is located between the opening portion 84e of the intake nozzle 84 and the carburetor 23, and thus, the opening portion 84e of the intake nozzle 84 is partitioned off from the carburetor 23 by the partition wall 85.

Thus, the partition wall 85 in the instant embodiment can prevent fuel, having been dropped or discharged from the outlet 39a of the discharge pipe 39, from being directed to the opening portion 84e and adhering to the opening portion 84e due to the cooling air from the cooling fan 2.

In addition, the opening portion 84e of the intake nozzle 84 opens in the opposite direction from the carburetor 23 (outlet 39a of the discharge pipe 39). Thus, fuel discharged from the outlet 39a of the discharge pipe 39 can be more reliably prevented from adhering to the opening portion 84e due to cooling air sent from the cooling fan 22.

Further, because the opening portion 84e of the intake nozzle 84 is located at the high position H1 above the filter cover 95, it is located higher than the intake 24a of the air cleaner 24 communicating with the carburetor 23. Thus, in a rainstorm, for example, a water surface will reach the intake 24a of the air cleaner 24 before reaching the opening portion 84e of the intake nozzle 84. The engine 12 can be deactivated by the water being sucked in through the intake 24a of the air cleaner 24, so that the water can be prevented from sucking in through the opening portion 84e of the intake nozzle 84.

Further, with the intake nozzle 84 connected to the air filter 83, the interior space of the air filter 83 can be used as a resonator, so that a silencing effect can be achieved. In addition, because the opening portion 84e of the intake nozzle 84 is oriented toward the lower space 36, it is oriented toward the interior of the power generator 10. Thus, sound noise can be effectively prevented from being leaked to the outside, so that a further silencing effect can be achieved.

Figure 10A:
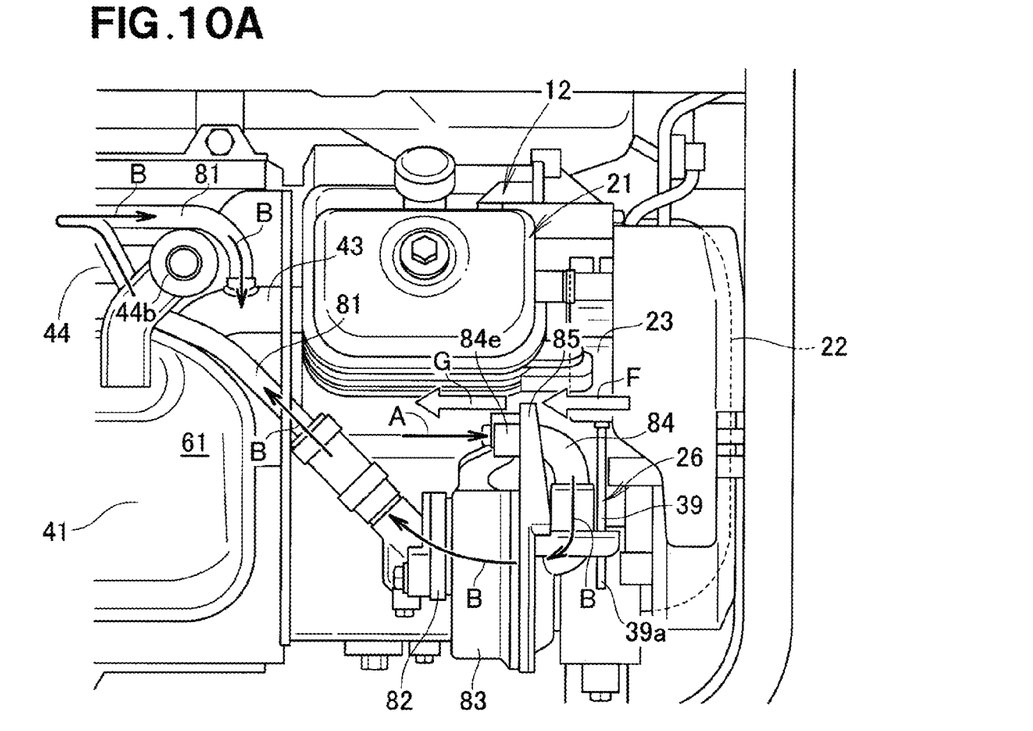
Figure 10B:
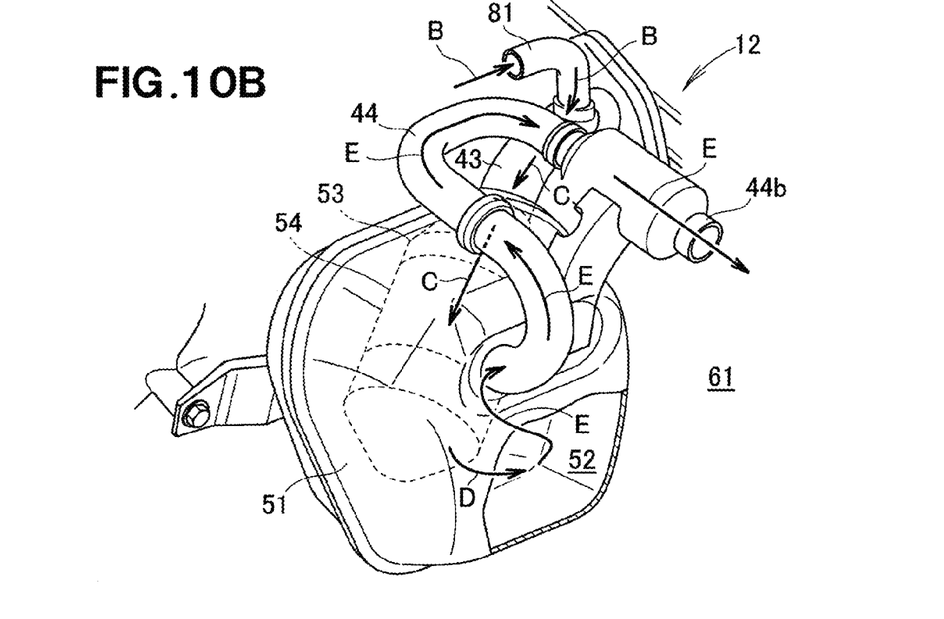

The following describes, with reference to FIG. 10, an example manner in which exhaust gas is oxidized and reduced by the catalyst converter 54 and entry of dust, dirt, rainwater, etc. into the intake nozzle 84 and adherence of fuel to the intake nozzle 84 is prevented in the instant embodiment.

During driving of the engine 12, as shown in FIG. 10A, exhaust gas is discharged from the distal end portion 44b of the tailpipe 44 to the outside 61 through the exhaust muffler 41 and the tailpipe 44. At the same time, air (secondary air) is sucked in through the intake nozzle 84 of the secondary air supply device 26 by use of exhaust pulsation of the engine 12, as indicated by arrow A. The air sucked into the intake nozzle 84 is directed to the exhaust pipe 43 via the air filter 83, the one-directional valve 82 and the secondary air introduction pipe 81, as indicated by arrow B.

Further, as shown in FIG. 10B, the air directed to the exhaust pipe 43 is directed through the exhaust pipe 43 to the retaining cylinder 53 together with exhaust gas directed to the exhaust pipe 43, as indicated by arrow C.

Further, in the instant embodiment, it is possible to secure suitable lengths of the tailpipe 44 of the exhaust muffler 41 and the secondary air introduction pipe 81. Thus, by the negative pressure produced by the exhaust pulsation of the engine 12, the air (secondary air) can be reliably supplied to the retaining cylinder 53 (i.e., to the catalyst converter 54).

Thus, the catalyst converter 54 is activated so that exhaust gas directed to the retaining cylinder 53 can be effectively oxidized or reduced (i.e., detoxified). The exhaust gas oxidized or reduced by the catalyst converter 54 is directed from the rear opening portion of the retaining cylinder 53 to the interior 52 of the muffler box 51 as indicated by arrow D. The exhaust gas thus directed to the interior 52 of the muffler box 51 is directed through the tailpipe 44 and discharged from the distal end portion 44b to the outside 61 as indicated by arrow E.

Referring now back to FIG. 10A, the cooling fan 22 rotates during driving of the engine 12, so that cooling air is sent or blown from the cooling fan 22 toward the engine body 21 as indicated by arrow F. The cooling air thus blown from cooling fan 22 is directed toward the exhaust muffler 41 by way of the lower space 36 as indicated by arrow G.

Because the opening portion 84a of the intake nozzle 84 is oriented in the opposite direction from the cooling fan 22 and is partitioned off from the carburetor 23 by the partition wall 85, cooling air from the cooling fan 22 can be prevented from reaching the opening portion 84a. Thus, it is possible to reliably prevent dust, dirt, rain water, etc. from entering through the opening portion 84e due to cooling air of the cooling fan 22.

Further, the opening portion 84a of the intake nozzle 84 is located above the outlet 39a of the discharge pipe 39. In addition, the opening portion 84a of the intake nozzle 84 is oriented in the opposite direction from the carburetor 23 and partitioned off from the carburetor 23 by the partition wall 85. Thus, fuel having dropped from the outlet 39a of the discharge pipe 39 can be prevented by the partition wall 85 from being directed to the opening portion 84e due to cooling air from the cooling fan 22. Thus, the fuel having dropped from the carburetor 23 can be prevented from adhering to the opening portion 84e of the intake nozzle 84.

It should be appreciated that the engine 12 equipped with secondary air supply device 26 of the present invention is not limited to the above-described embodiment and may be modified variously. For example, whereas the embodiment has been described above in relation to the case where the bolt 58 and the nut 59 are used as fastener members, the bolt 58 and the nut 59 may be replaced with a rivet or any other suitable fastener member.

Further, the shapes and constructions of the power generator 10, engine 12, fuel tank 16, secondary air supply device 26, cylinder 32, cylinder head 33, exhaust muffler 41, exhaust port 42, exhaust pipe 43, tailpipe 44, bolt 58, nut 59, secondary air introduction pipe 81, etc. are not limited to the ones illustratively shown and described above and may be modified as necessary.

The basic principles of the present invention are well suited for application to engines equipped with a secondary air supply device that connects an exhaust port of the engine to an exhaust muffler via an exhaust pipe and supplies air (secondary air) to the exhaust pipe.

What is claimed is:

1. An engine equipped with a secondary air supply device where a cylinder extends obliquely to define a space therebeneath, which comprises:
    a cooling fan disposed laterally of the cylinder;
    a carburetor disposed closer to the space than the cooling fan;
    an exhaust muffler disposed opposite from the carburetor with the cylinder interposed therebetween and in communication with a cylinder head, provided on the cylinder, via an exhaust pipe;
    a secondary air introduction pipe connected to the exhaust pipe and extending from the exhaust pipe to the space so that an inlet end portion of the secondary air introduction pipe is located in the space;
    an intake nozzle provided in communication with the inlet end portion of the secondary air introduction pipe and having an opening portion that opens directly to the atmosphere such that air sucked in through the opening portion of the intake nozzle by exhaust pulsation of the engine is directed to the secondary air introduction pipe via the intake nozzle, the opening portion of the intake nozzle being located in the space and directed to open in an opposite direction from the cooling fan; and a partition wall disposed between the opening portion of the intake nozzle and the carburetor, the partition wall supporting the intake nozzle and disposed between the opening portion of the intake nozzle and the cooling fan.

* * * * *